United States Patent
Gravesteijn

[15] 3,672,390
[45] June 27, 1972

[54] DRAW-OFF TUBE

[72] Inventor: Elbert Gravesteijn, Abcoude, Netherlands

[73] Assignee: Amstel Brouwerij N.V., Amsterdam, Netherlands

[22] Filed: July 14, 1970

[21] Appl. No.: 54,809

[30] Foreign Application Priority Data

July 16, 1969 Netherlands..........................6910931

[52] U.S. Cl.............................................137/212, 222/400.7
[51] Int. Cl..................................................................B67d 5/54
[58] Field of Search...............................137/212; 222/400.7

[56] References Cited

UNITED STATES PATENTS 3,036,586 5/1962 Reeve.....................................137/212

*Primary Examiner*—Alan Cohan
*Attorney*—Cushman, Darby & Cushman

[57] ABSTRACT

A draw-off tube having an extension to which there is detachably connected a head comprising a screwthreaded casing surrounding said extension coaxially, which screwthreaded casing admits of being screwed in the bung hole of a cask of beer. A movable ring valve is provided between the inner wall of the casing and the outer wall of the extension, which ring valve has its outer circumference adapted to simultaneously free or close a compressed gas passage and its inner circumference adapted to simultaneously free or close a beer passage formed by openings adjacent the closed end of the extension.

5 Claims, 4 Drawing Figures

INVENTOR.
ELBERT GRAVESTEIJN
BY
Cushman Darby & Cushman
ATTORNEYS

DRAW-OFF TUBE

The invention relates to a draw-off tube having on its free end a frontally closed tubular extension, to which there is detachably connected a head with an external, radial flange provided with flattened portions on its circumference, and a cylindrical externally screwthreaded casing extending axially from said flange and surrounding said tubular extension coaxially, which external screwthread, after insertion of the draw-off tube in a cask of beer or the like, admits of being screwed into the internal screwthread of the bung hole of the cask, a ring valve loaded by a spring, more particularly by a helical compression spring, being provided in the space between the inner circumference of the cylindrical casing and the outer circumference of the tubular extension, which ring valve is axially displaceable from the seats formed on said circumferences and which ring valve has its outer circumference adapted to free or close the compressed gas passage and has its inner circumference adapted to simultaneously free or close the beer passage formed by a row of radial openings provided in the wall of the tubular extension adjacent its free end, said cylindrical casing being provided with arms downwardly extending therefrom, which arms are detachably connected with a radial flange provided on the extension, which flange supports the compression spring.

A draw-off tube of this type, made of stainless steel, is generally known. Of such a tube the head is so constructed that the arms, which form an extension of the cylindrical casing, lie in a conical surface. Owing to this design, the tube can only be made by means of an expensive cutting operation, both on the lathe and in the drilling machine, for cutting the valve seats and several passages and openings.

The object of the invention is to so design in particular the head of the draw-off tube that it can be manufactured by injection moulding in a mould, mostly a sectional type of mould. To achieve this end the draw-off tube and its head are so constructed that the arms extend axially to lie in a cylindrical outer surface, whose diameter is equal to that of the core of said external screwthread, an opening being provided adjacent the free end of each arm, said openings being adapted to snappingly engage radially disposed arms extending from the support flange, after completion of the assembly.

An additional advantage is that the assembly or disassembly of the draw-off tube, for instance necessary for renewing the rubber ring valve or the helical compression spring loading same, can be effected in a very simple manner.

Besides the draw-off tube according to the invention may be so constructed that the openings in the arms are rectangular, the lower edge of said openings being outwardly and downwardly stepped, while the radial arms extending from the support flange are provided, at their free ends, with a perpendicular, downwardly extending lip which, after insertion in the opening of the respective arm will engage behind the upper step.

This construction result in a reliable and strong snap engagement. The rectangular shape of the openings can readily be obtained in the die-casting operation.

The invention will be further explained with reference to the drawings, showing an embodiment to which, however, the invention is not limited.

Figure 1:
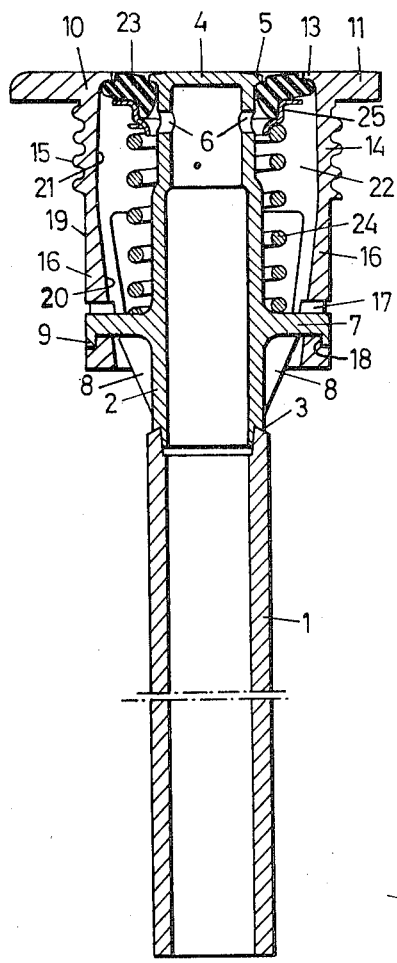
FIG. 1 is a longitudinal section through the draw-off tube and the head, in assembled condition of the construction.

In FIG. 1 the draw-off tube 1 is provided with an extension 2. The boundary planes 3 are so constructed that the two parts 1, 2, made from plastics can be interconnected by friction fusion. As may be supposed to be well-known, one of the two portions 1,2 or both portions are very rapidly rotated in mutually opposite sense about their axes and simultaneously axially pressed against each other. During this, the surface of the boundary surfaces melts and after subsequent stopping of the rotary movement the two parts fuse to form a sound connection. During this process, no adhesive or external heating is necessary.

The extension 2 is closed at its upper end and shows a slightly protruding peripheral wall 5. Just below the closed end there is a row of openings 6. (FIG. 1 only shows 2 such openings). The meaning thereof will be explained hereinafter.

Besides the extension 2 comprises a number of radial arms 7, arranged in the form of a star or in the form of a cross, which are strengthened by ribs 8. The arms 7 are at their free ends at 9 bent downwardly in the form of a hook.

Figure 3:
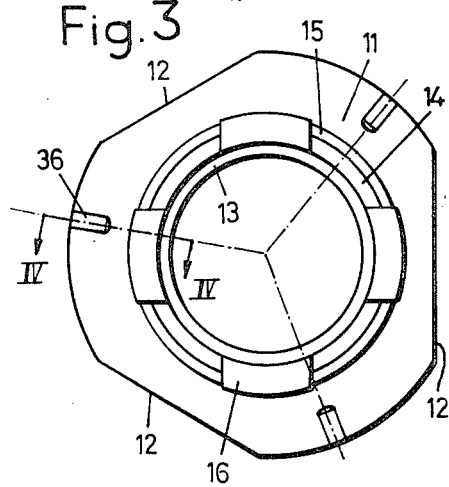
FIG. 3 is a top view of the head.
Figure 4:
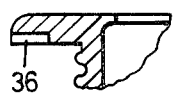
FIG. 4 is a section according to the line IV—IV in FIG. 3.

The extension 2 is coaxially surrounded by a head 10. This head has on its upper end a radial flange 11 which is in this case provided with three peripherally flattened portions 12 (see FIG. 3). The inner circumference of the flange shows a slightly protruding edge 13. At the lower side of the flange extends a cylindrical casing 14, provided on the outside with a screwthread 15.

Figure 2:
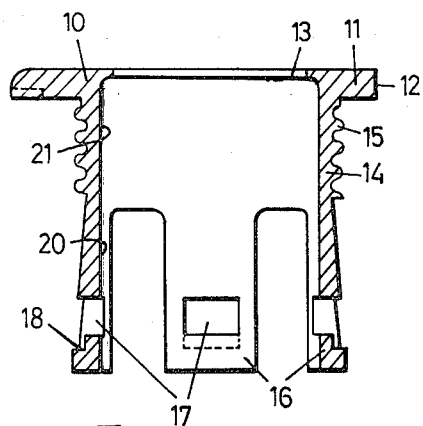
FIG. 2 is a longitudinal section through the head only.

The casing 14 has four arms 16 (see FIG. 2) downwardly depending therefrom, which adjacent their free ends each have a rectangular opening 17, the lower edge of which is outwardly and downwardly stepped, as is indicated by 18 (see FIG. 2).

In the assembled position the hook-shaped portion 9 of the radial arms 7 engages with this step. It appears from FIG. 1 that in the assembled condition the outer surface 19 of these arms is truly cylindrical and that the diameter thereof is equal to that of the core of the screwthread 15. In the disassembled condition (FIG. 2) the inner circumference 20 of the arms is truly cylindrical and has the same diameter as the inner circumference 21 of the casing.

It appears from the foregoing that the snap engagement of the parts 9 and 18 as effected by pressing the arms inwardly and downwardly forms a connection which is under tension.

In the annular space 22 between the head and the extension 2 there is provided a ring valve 23, for example of rubber, which valve is loaded by a helical compression spring 24, which surrounds the extension 2. The earlier mentioned edges 5, 13 form the seats for the ring valve 23. Between the valve and the spring there is provided a metal dished ring 25, against which the upper end of the spring abuts. The lower end of the spring rests on the radial arms 7, which are strengthened by ribs 8 to be able to resist the spring pressure.

In FIG. 1 the ring valve 23 is in the closed position. If it is pressed down over a certain distance — this is effected by means of a dispenser (not shown) to be placed on the flange 11 and to be clamped with fastening portions under the round circumferential portions of the flange — the outer circumference of the ring valve is desengaged from its seat 13. Also the inner circumference of this valve leaves the seat 5 and subsequently frees the passages 6. Along the edge of the seat 13 and the outer circumference compressed gas, in particular pressurized carbondioxyde gas, can flow via the space 22 into the cask of beer and press beer outwards via the draw-off tube 1 and the passages 6 along the inner circumference of the valve 23.

To avoid that prior to entirely unscrewing the cap and gland which form part of the dispenser positioned on the head of the draw-off tube, this cap is released from the head of the draw-off tube before the supply of carbon dioxide gas is closed down, each time one recess 36 is provided in the lower side of the non-flattened portions of the circumference of the flange 11 of the head 10, which recess extends from this circumference over some distance radially inwardly. Each of these recess is adapted to come into locked engagement with a cam provided on the lower edge of the cap, which cams face the recess. Each non-flattened portion of the cap has such a cam and there are as many cams as there are recesses. The locking engagement is effected when the circular portions of the flange and the cap slide one over the other, and is broken when the cap and a gland, also forming part of the dispenser, are entirely unscrewed. The recesses 36 and the cams define equal angles as seen from the center of a circle, which center is formed by the longitudinal axis of the draw-off tube. If there are three recesses and three cams these angles are 120° each.

Owing to the fact that the portions of the above assembly are made of synthetic material, in particular of those types which are commercially known by the names of Delrin acetal homopolymer and Hostaform acetal copolymer, the simplified design of the various portions has become possible. Said types of synthetic material are neither affected by carbon dioxide gas nor by beer, so that the flavor of the beer is not adversely affected.

It will be clear that variations are possible on minor points without departing from the scope of the invention.

I claim:

1. A draw-off tube having on its free end a frontally closed tubular extension, to which there is detachably connected a head with an external radial flange and a cylindrical externally screwthreaded casing extending axially and downwardly from said flange and surrounding said tubular extension coaxially, which external screwthread, after insertion of the draw-off tube in a cask of beer or the like, admits of being screwed into the internal screwthread of the bung hole of the cask, a movable ring valve being provided in the space between the inner wall of the cylindrical casing and the outer wall of the tubular extension, which ring valve is substantially flush with the radial flange and is caused to abut against seats formed by the ends of said inner and outer walls by a spring, in particular a helical compression spring, said ring valve having its outer circumference adapted to simultaneously free or close a compressed gas passage and having its inner circumference adapted to simultaneously free or close a beer passage formed by a row of radial openings provided adjacent the closed end of the tubular extension, which cylindrical casing has a downward extension to a support flange for the compression spring, which flange is provided on the tubular extension and is detachably connected to the downward extension of the casing, characterized in that said downward extension comprises a number of axially extending arms which in the untensioned condition define an outwardly flaring slightly conical outer surface and a cylindrical inner surface in relation to the screwthread core, the free ends of each of said arms being provided with an opening each of which receives one of a corresponding number of radially disposed arms extending from the support flange when the cylindrical casing is slid over the tubular extension.

2. A draw-off tube according to claim 1, characterized in that the openings in the arms are rectangular, the lower edge thereof being outwardly and downwardly stepped, while the arms extending from the support flange are provided on their free ends with a perpendicular, downwardly extending lip which, after insertion in the respective opening, snappingly engages behind the stepped lower edge of said opening, the outer surface of the axial arms now being a cylindrical one and the inner surface now having a narrowing conical shape.

3. A draw-off tube according to claim 1 wherein the circumference of the radial flange of the head has at its lower side non-flattened portions each having one recess extending from said circumference over some distance radially inwardly, which recess is adapted to come into locking engagement with each time one cam of a number of cams that is equal to the number of recesses, which cams are provided on each of the non-flattened portions at the lower edge of a cap forming part of a dispenser placed on the head of the draw-off tube, which cams face the recesses, said locking engagement being effected when the non-flattened portions of the flange and of the lower edge of the cap slide one over the other, and being broken when the cap and a gland likewise belonging to the dispenser are entirely unscrewed, the recesses and the cams being so positioned as to define equal angles at the center located on the longitudinal axis of the draw-off tube.

4. A draw-off tube according to claim 1, characterized in that the connection between the tubular extension and the draw-off tube, both manufactured of synthetic material by injection moulding, is effected by friction fusion, to which end said extension and said tube are provided with appropriate annular surfaces.

5. A draw-off tube according to claim 4, characterized in that the synthetic material used is an acetal homocopolymer commercially available under the trade name of Delrin or an acetal copolymer commercially available under the trade name of Hostaform.

* * * * *